US009556688B2

(12) United States Patent
Orgeron et al.

(10) Patent No.: US 9,556,688 B2
(45) Date of Patent: *Jan. 31, 2017

(54) RAISE-ASSIST AND SMART ENERGY SYSTEM FOR A PIPE HANDLING APPARATUS

(71) Applicant: T&T Engineering Services, Inc., Tomball, TX (US)

(72) Inventors: Keith J. Orgeron, Spring, TX (US); Axel M. Sigmar, Lago Vista, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 99 days.

This patent is subject to a terminal disclaimer.

(21) Appl. No.: 14/502,874

(22) Filed: Sep. 30, 2014

(65) Prior Publication Data
US 2015/0016924 A1 Jan. 15, 2015

Related U.S. Application Data

(63) Continuation of application No. 13/466,911, filed on May 8, 2012, now Pat. No. 8,876,452, which is a
(Continued)

(51) Int. Cl.
*B25J 9/04* (2006.01)
*B25J 9/02* (2006.01)
(Continued)

(52) U.S. Cl.
CPC .............. *E21B 19/155* (2013.01); *B23P 19/10* (2013.01); *Y10S 414/126* (2013.01); *Y10S 901/48* (2013.01)

(58) Field of Classification Search
USPC ................. 91/195, 172, 176, 236, 323, 390, 508,91/510; 92/22.51–22.59, 601–602, 673, 719, 92/8, 85 B, 85 R
See application file for complete search history.

(56) References Cited

U.S. PATENT DOCUMENTS

| 62,404 A | 2/1867 | Gile et al. |
| 184,168 A | 11/1876 | Nickle |

(Continued)

FOREIGN PATENT DOCUMENTS

| WO | 93/15303 A1 | 8/1993 |
| WO | 2006/038790 A1 | 4/2006 |

*Primary Examiner* — Gregory Adams
(74) *Attorney, Agent, or Firm* — John G. Fischer, Esq.; Scheef & Stone, L.L.P.

(57) ABSTRACT

The invention relates to a pipe handling apparatus that delivers and positions tubulars at a wellhead and a device for assisting pivotal movement of a boom relative to a base of the apparatus. A pneumatic spring assembly is pivotally connected between the boom and base. During operation, the pneumatic spring assembly urges the boom from a first position to a second position and resists movement of the boom from the second position to the first position. A pneumatic reservoir may be attached to the pipe handling apparatus. A gas-charging assembly fluidically connects the pneumatic spring assembly and pneumatic reservoir and allows the pneumatic reservoir to vary the pneumatic pressure within the pneumatic spring assembly. Sensors mounted in the pipe handling apparatus may provide feedback to a controller which may automatically adjust the amount of pneumatic pressure within the pneumatic springs for ideal performance of the springs.

12 Claims, 6 Drawing Sheets

Related U.S. Application Data continuation-in-part of application No. 12/418,302, filed on Apr. 3, 2009, now Pat. No. 8,172,497.

(51) Int. Cl.
*B25J 9/10* (2006.01)
*B25J 19/00* (2006.01)
*E21B 19/15* (2006.01)
*B23P 19/10* (2006.01)

(56) References Cited

U.S. PATENT DOCUMENTS

| | | | |
|---|---|---|---|
| 514,715 A | 2/1894 | Jenkins | |
| 1,264,867 A | 4/1918 | Schuh | |
| 1,312,009 A | 8/1919 | Thrift | |
| 1,318,789 A | 10/1919 | Moschel | |
| 1,369,165 A | 2/1921 | Cochran et al. | |
| 2,124,154 A | 7/1937 | Sovincz | |
| 2,327,461 A | 8/1943 | Rowe | |
| 2,382,767 A | 8/1945 | Zeilman | |
| 2,497,083 A | 2/1950 | Hildebrand | |
| 2,535,054 A | 12/1950 | Ernst et al. | |
| 2,592,168 A | 8/1952 | Morris et al. | |
| 2,715,014 A | 8/1955 | Gamett et al. | |
| 2,770,493 A | 11/1956 | Fieber | |
| 2,840,244 A | 6/1958 | Thomas, Jr. | |
| 2,916,205 A * | 12/1959 | Litz | F15B 11/02 116/DIG. 42 |
| 3,059,905 A | 10/1962 | Tompkins | |
| 3,063,425 A * | 11/1962 | Be Vier | F15B 9/12 91/375 R |
| 3,076,560 A | 2/1963 | Bushong et al. | |
| 3,177,944 A | 4/1965 | Knights | |
| 3,262,593 A | 7/1966 | Hainer | |
| 3,280,920 A | 10/1966 | Scott | |
| 3,331,585 A | 7/1967 | Dubberke | |
| 3,365,762 A | 1/1968 | Spirt | |
| 3,425,372 A | 2/1969 | Zucchellini | |
| 3,464,507 A | 9/1969 | Alexander et al. | |
| 3,561,811 A | 2/1971 | Turner, Jr. | |
| 3,633,466 A | 1/1972 | Field | |
| 3,633,771 A | 1/1972 | Woolslayer et al. | |
| 3,638,423 A * | 2/1972 | Van Heijst | E02F 3/966 60/370 |
| 3,702,640 A | 11/1972 | Cintract et al. | |
| 3,703,968 A | 11/1972 | Uhrich et al. | |
| 3,806,021 A | 4/1974 | Moroz et al. | |
| 3,823,916 A | 7/1974 | Shaw | |
| 3,848,850 A | 11/1974 | Bemis | |
| 3,860,122 A | 1/1975 | Cernosek | |
| 3,963,133 A | 6/1976 | Gilli | |
| 3,986,619 A | 10/1976 | Woolslayer et al. | |
| 3,991,887 A | 11/1976 | Trout | |
| 3,995,746 A | 12/1976 | Usagida | |
| 4,011,694 A | 3/1977 | Langford | |
| 4,030,698 A | 6/1977 | Hansen | |
| 4,044,952 A | 8/1977 | Williams et al. | |
| 4,142,551 A | 3/1979 | Wilms | |
| 4,158,283 A | 6/1979 | Nation | |
| 4,172,684 A | 10/1979 | Jenkins | |
| 4,226,167 A | 10/1980 | Lew | |
| 4,276,918 A | 7/1981 | Sigouin | |
| 4,277,044 A | 7/1981 | Hamilton | |
| 4,290,495 A | 9/1981 | Elliston | |
| 4,303,270 A | 12/1981 | Adair | |
| 4,336,840 A | 6/1982 | Bailey | |
| 4,338,965 A | 7/1982 | Garnjost et al. | |
| 4,403,666 A | 9/1983 | Willis | |
| 4,403,897 A | 9/1983 | Willis | |
| 4,407,629 A | 10/1983 | Willis | |
| 4,420,917 A | 12/1983 | Parlanti | |
| 4,440,536 A | 4/1984 | Scaggs | |
| 4,492,501 A | 1/1985 | Haney | |
| 4,529,094 A | 7/1985 | Wadsworth | |
| 4,547,110 A | 10/1985 | Davidson et al. | |
| 4,595,066 A | 6/1986 | Nelmark et al. | |
| 4,650,237 A | 3/1987 | Lessway | |
| 4,658,970 A | 4/1987 | Oliphant | |
| 4,681,172 A | 7/1987 | Mikiya et al. | |
| 4,688,983 A | 8/1987 | Lindbom | |
| 4,708,581 A | 11/1987 | Adair | |
| 4,756,204 A | 7/1988 | Wittwer et al. | |
| 4,759,414 A | 7/1988 | Willis | |
| 4,765,225 A | 8/1988 | Birchard | |
| 4,765,401 A | 8/1988 | Boyadjieff | |
| 4,821,816 A | 4/1989 | Willis | |
| 4,822,230 A | 4/1989 | Slettedal | |
| 4,834,604 A | 5/1989 | Brittain et al. | |
| 4,869,137 A | 9/1989 | Slator | |
| 5,060,762 A | 10/1991 | White | |
| 5,135,119 A | 8/1992 | Larkin | |
| 5,186,264 A | 2/1993 | du Chaffaut | |
| 5,458,454 A | 10/1995 | Sorokan | |
| 5,481,959 A | 1/1996 | Watanabe et al. | |
| 5,597,987 A | 1/1997 | Gilliland et al. | |
| 5,609,226 A | 3/1997 | Penisson | |
| 5,649,745 A | 7/1997 | Anderson | |
| 5,660,087 A | 8/1997 | Rae | |
| 5,671,932 A | 9/1997 | Chapman | |
| 5,806,589 A | 9/1998 | Lang | |
| 5,848,647 A | 12/1998 | Webre et al. | |
| 5,915,673 A | 6/1999 | Kazerooni | |
| 5,964,550 A | 10/1999 | Blandford et al. | |
| 5,992,801 A | 11/1999 | Torres | |
| 5,993,140 A | 11/1999 | Crippa | |
| 6,003,598 A | 12/1999 | Andreychuk | |
| 6,085,501 A * | 7/2000 | Walch | A01B 63/10 172/7 |
| 6,158,516 A | 12/2000 | Smith et al. | |
| 6,220,807 B1 | 4/2001 | Sorokan | |
| 6,234,253 B1 | 5/2001 | Dallas | |
| 6,253,845 B1 | 7/2001 | Belik | |
| 6,264,128 B1 | 7/2001 | Shampine et al. | |
| 6,264,395 B1 | 7/2001 | Allamon et al. | |
| 6,279,662 B1 | 8/2001 | Sonnier | |
| 6,343,892 B1 | 2/2002 | Kristiansen | |
| 6,398,186 B1 | 6/2002 | Lemoine | |
| 6,431,286 B1 | 8/2002 | Andreychuk | |
| 6,471,439 B2 | 10/2002 | Allamon et al. | |
| 6,502,641 B1 | 1/2003 | Carriere et al. | |
| 6,543,551 B1 | 4/2003 | Sparks et al. | |
| 6,543,555 B2 | 4/2003 | Casagrande | |
| 6,557,641 B2 | 5/2003 | Sipos et al. | |
| 6,564,667 B2 | 5/2003 | Bayer et al. | |
| 6,609,573 B1 | 8/2003 | Day | |
| 6,705,414 B2 | 3/2004 | Simpson et al. | |
| 6,711,984 B2 * | 3/2004 | Tagge | F15B 11/076 92/82 |
| 6,745,646 B1 | 6/2004 | Pietras et al. | |
| 6,748,823 B2 | 6/2004 | Pietras | |
| 6,779,614 B2 | 8/2004 | Oser | |
| 6,814,149 B2 | 11/2004 | Liess et al. | |
| 6,845,814 B2 | 1/2005 | Mason et al. | |
| 7,028,585 B2 | 4/2006 | Pietras et al. | |
| 7,055,594 B1 | 6/2006 | Springett et al. | |
| 7,059,127 B2 * | 6/2006 | Bauer | B60G 17/0152 60/416 |
| 7,077,209 B2 | 7/2006 | McCulloch et al. | |
| 7,090,035 B2 | 8/2006 | Lesko | |
| 7,090,254 B1 | 8/2006 | Pietras et al. | |
| 7,117,938 B2 | 10/2006 | Hamilton et al. | |
| 7,121,166 B2 | 10/2006 | Drzewiecki | |
| 7,172,038 B2 | 2/2007 | Terry et al. | |
| 7,246,983 B2 | 7/2007 | Zahn et al. | |
| 7,289,871 B2 | 10/2007 | Williams | |
| 7,331,746 B2 | 2/2008 | Wright et al. | |
| 7,398,833 B2 | 7/2008 | Ramey et al. | |
| 7,438,127 B2 | 10/2008 | Lesko | |
| 7,726,929 B1 | 6/2010 | Orgeron | |
| 7,918,636 B1 | 4/2011 | Orgeron | |
| 7,946,795 B2 | 5/2011 | Orgeron | |
| 7,980,802 B2 | 7/2011 | Orgeron | |
| 8,128,332 B2 | 3/2012 | Orgeron | |
| 8,172,497 B2 | 5/2012 | Orgeron et al. | |

(56) References Cited

U.S. PATENT DOCUMENTS

| | | |
|---|---|---|
| 8,419,335 B1 | 4/2013 | Orgeron |
| 8,876,452 B2 | 11/2014 | Orgeron et al. |
| 2002/0070187 A1 | 6/2002 | Willim |
| 2003/0221871 A1 | 12/2003 | Hamilton et al. |
| 2004/0211598 A1 | 10/2004 | Palidis |
| 2005/0193645 A1 | 9/2005 | Barnes |
| 2008/0253866 A1 | 10/2008 | Lops et al. |
| 2010/0032213 A1 | 2/2010 | Orgeron |
| 2010/0187740 A1 | 7/2010 | Orgeron |

\* cited by examiner

RAISE-ASSIST AND SMART ENERGY SYSTEM FOR A PIPE HANDLING APPARATUS

CROSS-REFERENCE TO RELATED APPLICATIONS

This application is a continuation application of application Ser. No. 13/466,911 filed May 8, 2012, which is a continuation-in-part of and claims the benefit of priority to application Ser. No. 12/418,302 filed Apr. 3, 2009, now U.S. Pat. No. 8,172,497.

FIELD OF THE INVENTION

The present invention relates to the delivery of tubulars from a horizontal orientation to a vertical orientation at a well head. Particularly, the present invention relates to a pipe handling apparatus that positions tubulars at a wellhead. More particularly, the present invention relates to a device for assisting pivotal movement of a boom relative to a base of a pipe handling apparatus.

BACKGROUND OF THE INVENTION

Drill rigs have utilized several methods for transferring tubular members from a pipe rack adjacent to the drill floor to a mousehole in the drill floor or the well bore for connection to a previously transferred tubular or tubular string. The term "tubular" as used herein includes all forms of pipe, drill pipe, drill collars, casing, liner, bottom hole assemblies (BHA), and other types of tubulars known in the art.

Conventionally, drill rigs have utilized a combination of the rig cranes and the traveling system for transferring a tubular from the pipe rack to a vertical position above the center of the well. The obvious disadvantage with the prior art systems is that there is a significant manual involvement in attaching the pipe elevators to the tubular and moving the pipe from the drill rack to the rotary table at the wellhead. This manual transfer operation in the vicinity of workers is potentially dangerous and has caused numerous injuries in drilling operations. Further, the hoisting system may allow the tubular to come into contact with the catwalk or other portions of the rig as the tubular is transferred from the pipe rack to the drill floor. This can damage the tubular and may affect the integrity of the connections between successive tubulars in the well.

In the past, various devices have been created which mechanically move a pipe from a horizontal orientation to a vertical orientation such that the vertically-oriented pipe can be installed into the well bore. Typically, these devices have utilized several interconnected arms that are associated with a boom. In order to move the pipe, a succession of individual movements of the levers, arms, and other components of the boom must be performed in a coordinated manner in order to achieve the desired result. Typically, a wide variety of hydraulic actuators are connected to each of the components so as to carry out the prescribed movement. A complex control mechanism is connected to each of these actuators so as to achieve the desired movement. Advanced programming is required of the controller in order to properly coordinate the movements in order to achieve this desired result.

Unfortunately, with such systems, the hydraulic actuators, along with other components, can become worn with time. Furthermore, the hydraulic integrity of each of the actuators can become compromised over time. As such, small variations in each of the actuators can occur. These variations, as they occur, can make the complex mechanism rather inaccurate. The failure of one hydraulic component can exacerbate the problems associated with the alignment of the pipe in a vertical orientation. Adjustments of the programming are often necessary so as to continue to achieve the desired results. Fundamentally, the more hydraulic actuators that are incorporated into such a system, the more likely it is to have errors, inaccuracies and deviations in the desired delivery profile of the tubular. Typically, very experienced and knowledgeable operators are required to carry out this pipe movement operation. This adds significantly to the cost associated with pipe delivery.

To address these problems and needs, U.S. application Ser. No. 11/923,451, filed on Oct. 24, 2007 by the present applicant, discloses a pipe handling apparatus that has a boom pivotally movable between a first position and a second position, a lever assembly pivotally connected to the boom, an arm pivotally connected at one end to the first portion of the lever assembly and extending outwardly therefrom, a gripper affixed to an opposite end of the arm suitable for gripping a diameter of the pipe, a link pivotally connected to the lever assembly and pivotable so as to move relative to the movement of the boom between the first and second positions, and a brace having one end pivotally connected to the boom and an opposite end pivotally connected to the arm between the ends of the arm. The lever assembly has a first portion extending outwardly at an obtuse angle with respect to the second portion.

The pipe handling apparatus delivers a pipe to a wellhead when in the second position. The boom of the above pipe handling apparatus is pivotally connected to a skid so as to pivot between the first and second positions. Pipes can be of extraordinary lengths and weights; therefore, the pivotal connection between the boom and skid must be strong so as to withstand the forces created by the movement of the boom between the first and second positions. Typically, hydraulic cylinders are placed between the boom and skid so as to raise and lower the boom between the first and second positions. The hydraulic cylinders are connected to a hydraulic power system so as to raise and lower the boom between the first and second positions. Through use of the above-discussed pipe handling apparatus, it was found that large amounts of power are needed for certain portions of the power band of the stroke of the hydraulic cylinders. That is, the power requirements for extending the hydraulic cylinders so as to move the boom between the first and second positions is not uniform for the entire movement of the hydraulic cylinders. Thus, there is a need to make the power band of the hydraulic cylinders more uniform across the entire length of travel of the hydraulic cylinders. Moreover, there is a need to reduce the total energy required to move the boom between the first and second positions.

Various patents have issued relating to the movement of a boom of a pipe handling apparatus with hydraulic cylinders or other similar means. For example, U.S. Pat. No. 7,077,209, issued on Jul. 18, 2006 to McCulloch et al., discloses a mast for lifting and suspending a coiled tubing injector and blowout preventer over a wellhead that is pivotally mounted on a rear portion of a truck. The mast has two side-by-side telescoping legs that extend and retract synchronously. Hydraulic cylinders pivotally move the mast between a lower position and an upper position.

U.S. Pat. No. 4,336,840, issued on Jun. 29, 1982 to Bailey, discloses a suspension system for use with a mast. The system has two or more fluid pressure piston-and-cylinder assemblies. The cylinders are linked in pairs so that retraction of both piston rods reduces the length of the pair of assemblies to the length of a single assembly. Operation of both pistons in a pair provides an effective stroke twice the length of a single assembly stroke. In a particular embodiment, a double cylinder system is used as a pickup system for elevating equipment along a mast in a well work over rig.

U.S. Pat. No. 7,289,871, issued on Oct. 30, 2007 to Williams, discloses a drilling apparatus that has a base from which a drilling arm is pivotally mounted. The drilling arm has an inner arm and an outer arm. The inner arm has a first end and a second end. The first end is pivotally connected by a first pivot joint to the base. The outer arm has a first end and a second end. The second end of the inner arm is pivotally connected via a second pivot joint to the first end of the outer arm. A drill-mounting assembly is positioned at the second end of the outer arm. Actuation of the inner and outer arms is achieved by hydraulic cylinders. Proper operation of the cylinders causes the second end of the outer arm to follow a substantially linear path.

U.S. Pat. No. 6,003,598, issued on Dec. 21, 1999 to Andreychuk, discloses a mobile hybrid rig adapted to run coiled tubing and wireline equipment for oil and gas wells. The rig has a chassis and power unit for transporting the rig. An adjustable platform with a number of hydraulically-operated stabilizers aligns the tubing at the wellhead. A mast is pivotable into slanted or vertical positions for coil tubing operation with a blowout preventer and an injector. A cradle supports and aligns an injector to the wellhead. A coil-tubing reel cartridge assembly is adapted to run coil-tubing reels. A winching facility is used to manipulate wireline equipment. A control cabin is used to manage rig activities.

U.S. Pat. No. 6,234,253, issued on May 22, 2001 to Dallas, discloses a method and apparatus for servicing a well. The apparatus has a pair of hydraulic cylinders pivotally mounted to a pair of base beams. The cylinders are movable from a horizontal position for transportation to a vertical position for operation. In the vertical position, the cylinders flank a wellhead and are adapted to lift the wellhead and attached production tubing using a workover beam and a lifting sub. The wellhead and production tubing can be rotated during or after elevation. A motor can be mounted to the workover beam to rotate the wellhead and the tubing. A calibrated pressure gauge can be used to indicate the weight being lifted. The apparatus can be connected to a crane truck.

U.S. Pat. No. 6,264,128, issued on Jul. 24, 2001 to Shampine et al., discloses a levelwind system for a coiled-tubing reel that has an arcuate guide arm extending over the upper surface of the reel, a universal joint mounted to the lower end of the arm, a guide member supported on the free end of the guide arm, a lift cylinder for raising and lowering the guide arm, a balancing cylinder for moving the guide arm laterally, and a hydraulic fluid circuit that is responsive to a position sensor and a microprocessor.

U.S. Pat. No. 6,431,286, issued on Aug. 13, 2002 to Andreychuk, discloses an injector arrangement for use in a rig that has a movable carrier, a derrick tiltably mounted to the carrier, and a trolley capable of sliding along the derrick. An injector cradle is movable along the trolley in at least a plane perpendicular to the derrick and is pivotally mountable beneath the trolley. An injector is supported at its upper end from the cradle. At least two hydraulic cylinders are supported at one end by the derrick. The cylinders are engaged at an opposed end to a lower end of the injector.

U.S. Pat. No. 6,502,641, issued on Jan. 7, 2003 to Carriere et al., discloses a hybrid apparatus for operation with both coiled tubing and sectional tubing that has a coiled-tubing rig. The rig has a frame, a mast normally aligned over a wellhead, an injector located on the mast, and a tubing straightener positioned between the injector and the wellhead. A rotary table is affixed to the wellhead for rotationally supporting tubing passing through the wellhead. A jib crane is mounted atop the mast. A mechanism pivots the mast between a first position and a second position.

It is an object of the present invention to reduce operating pressures of hydraulic cylinders connected to the boom of a pipe handling apparatus.

It is another object of the present invention to decrease the duty of hydraulic cylinders of a pipe handling apparatus.

It is another object of the present invention to reduce the peak and average horsepower requirements for pivoting a boom of a pipe handling apparatus.

It is still another object of the present invention to reduce peak cooling requirements while lowering the boom of a pipe handling apparatus.

It is another object of the present invention to reduce fuel consumption due to pivoting a boom of a pipe handling apparatus by up to seventy-five percent.

It is another object of the present invention to create negative gravity accelerations while lowering the boom of a pipe handling apparatus so as to almost "float" the boom.

It is another object of the present invention to provide extra capacity or speed in horse power of a pipe handling apparatus.

It is still another object of the present invention to increase the useful life and reliability of a pipe handling apparatus.

It is another object of the present invention to create lifting mechanisms for a boom of a pipe handling apparatus that are completely separate sub systems that have no significant impact on raising the boom or controlling the boom.

These and other objects and advantages of the present invention will become apparent from a reading of the attached specification and appended claims.

BRIEF SUMMARY OF THE INVENTION

The present invention is an apparatus for pivoting a boom relative to a frame of a pipe handling system between a first position and a second position. The apparatus includes the frame, a boom pivotally interconnected to the frame so as to be movable between the first position and the second position, a hydraulic actuating assembly having one end affixed to the frame and an opposite end connected to the boom so as to move the boom between the first and second positions, and a pneumatic spring assembly having one end affixed to the frame and an opposite end connected to the boom. The pneumatic spring assembly serves to urge the boom from the first position to the second position while resisting movement of the boom from the second position to the first position.

The hydraulic actuating assembly comprises a cylinder having one end pivotally coupled to the frame, a piston slidably received in the cylinder and extending outwardly therefrom so as to have an end pivotally coupled to the boom, and a hydraulic fluid pumping assembly fluidically connected to the cylinder. The hydraulic fluid pumping assembly serves to deliver hydraulic fluid to the cylinder so as to urge against the piston so as to move the boom from the first position to the second position.

The pneumatic spring assembly comprises a cylinder having one end pivotally coupled to the boom and a piston slidably received in the cylinder and extending outwardly therefrom. The piston is pivotally coupled to the frame. The piston defines a gas-containing space within the cylinder. This gas-containing space is filled with a compressible fluid. In the preferred embodiment of the present invention, the compressible fluid is a nitrogen gas. A gas-charging assembly is fluidically coupled to the gas-containing space so as to pass the compressible fluid into the gas-containing space. The gas-charging assembly may be connected to a reservoir for containing compressible fluid. The reservoir may be used to increase or decrease the amount of compressible gas within the cylinder of the pneumatic spring, which in turn increases or decreases the stiffness of the pneumatic spring. This results in increased or decreased pushing and braking forces that the pneumatic spring may exert on the boom.

In a preferred embodiment of the present invention, the gas-charging assembly may further comprise a feedback mechanism for monitoring the pressure in the gas-containing space, as well as the current load upon the boom as the boom travels between the first and second positions. The feedback mechanism may also operate in real-time for actively monitoring the pressure in the gas-containing space. As the load upon the boom, and therefore the pressure within the gas-containing space changes, the feedback mechanism senses these pressure changes and the gas-charging assembly accordingly adjusts the volume of compressible fluid within the gas-containing space in order to provide greater pneumatic resistance for heavier loads and lesser pneumatic resistance for lighter loads.

Specifically, the hydraulic actuating assembly comprises a first piston-and-cylinder assembly connected adjacent one side of the frame and adjacent one side of the boom, and a second piston-and-cylinder assembly connected adjacent an opposite side of the frame and adjacent an opposite side of the boom. The pneumatic spring assembly is positioned between the first and second piston-and-cylinder assemblies of the hydraulic actuating means. In the preferred embodiment of the present invention, the pneumatic spring assembly comprises a pair of piston-and-cylinder assemblies extending in generally parallel relation to each other.

The piston defines a liquid-containing space within the cylinder. This liquid-containing space has a corrosion-resistant liquid therein.

In the present invention, the pipe handling system further includes a lever assembly pivotally coupled to the boom, an arm pivotally connected at one end to the first portion of the lever assembly and extending outwardly therefrom, a link pivotally connected to the second portion of the lever assembly so as to pivot at an end of the second portion opposite of the first portion so as to move relative to the movement of the boom between the first and second positions, a brace having an end pivotally connected to the boom and an opposite end pivotally connected to the arm, and a gripper attached to an opposite end of the arm for gripping a surface of a tubular. The gripper includes a stab frame fixedly attached to the opposite end of the arm and at least one gripper attached to a side of the stab frame opposite the arm.

In the preferred embodiment of the present invention, the frame is a skid that extends in a generally horizontal plane. The boom extends in generally parallel relation to the skid in the first position. The boom extends angularly upwardly of the skid in the second position.

DETAILED DESCRIPTION OF THE INVENTION

Figure 1:
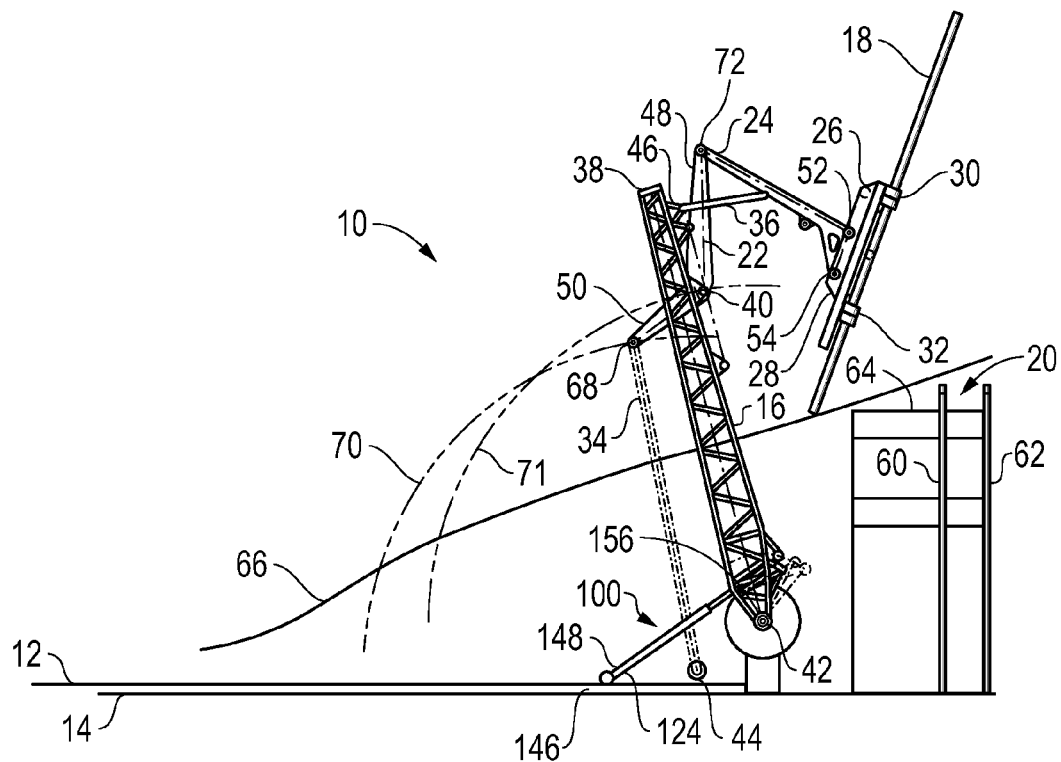
FIG. 1 shows a side elevational view of the apparatus of the present invention as used on a pipe handling system.

Referring to FIG. 1, there is shown a side elevational view of the preferred embodiment of the apparatus 100 of the present invention as used with a pipe handling system 10. The pipe handling system 10 is mounted on a frame 12 (such as a skid) that is supported upon the bed 14 of a vehicle, such as a truck. The pipe handling system 10 includes a boom 16 that is pivotally movable between a first position and a second position relative to a frame 12. In FIG. 1, an intermediate position of the pipe handling system 10 is particularly shown. In this position, the pipe 18 is illustrated in its position prior to installation on the drill rig 20. A lever assembly 22 is pivotally connected to the boom 16. An arm 24 is pivotally connected to an end of the lever assembly 22 opposite the boom 16. A gripper 26 is fixedly connected to an opposite end of the arm 24 opposite the lever assembly 22. The gripper 26 includes a stab frame 28 and grippers 30 and 32. A link 34 has one end pivotally connected to the frame 12 and an opposite end pivotally connected to the end of the lever assembly 22 opposite the arm 24. A brace 36 is pivotally connected to a small frame member 46 of the boom 16 and also pivotally connected to the arm 24 between the lever assembly 22 and the stab frame 28 of gripper 26.

The apparatus 100 of the present invention extends between the boom 16 and the frame 12 of the pipe handling system 10. The second hydraulic piston-and-cylinder assembly 124 can be seen from side 146 of the frame 12. The system 10 is in an intermediate position between the first and second positions; thus the piston 156 can be seen as extending outwardly from an interior of the cylinder 148 of the second hydraulic piston-and-cylinder assembly 124. The other piston-and-cylinder assemblies and pneumatic springs are in extended positions similar to that of the second hydraulic piston-and-cylinder assembly 124. These pneumatic springs are illustrated in greater detail in FIGS. 6 and 7.

The boom 16 is a structural framework of struts, cross members and beams. In particular, the boom 16 is configured so as to have an open interior such that the pipe 18 will be able to be lifted in a manner so as to pass through the interior of the boom 16. As such, the end 38 of the boom 16 should be strongly reinforced so as to provide the necessary structural integrity to the boom 16. A lug 40 extends outwardly from one side of the boom 16. This lug 40 is suitable for pivotable connection to the lever assembly 22. The boom 16 is pivotally connected at the opposite end 42 to a location on the frame 12. The pivotable connection at end 42 of the boom 16 is located in offset relationship and above the pivotable connection 44 of the link 34 with the frame 12. A small frame member 46 extends outwardly from the side of the boom 16 opposite the link 34. This frame assembly 46 has a pivotable connection with the brace 36.

The lever assembly 22 includes a first portion 48 and a second portion 50. The first portion 48 extends at an obtuse angle with respect to the second portion 50. The link 34 is pivotally connected to the end of the second portion 50 opposite the first portion 48. The arm 24 is pivotally connected to the end of the first portion 48 opposite the second portion 50. The lug 40 of the boom 16 is pivotally connected in an area generally between the first portion 48 and the second portion 50. This unique arrangement of the lever assembly 22 facilitates the ability of the present invention to carry out the movement of the pipe 18 between the horizontal orientation and the vertical orientation.

The arm 24 has an end pivotally connected to the end of the first portion 48 of the lever assembly 22. The opposite end of the arm 24 is connected to the gripper 26. In particular, a pair of pin connections engages a surface of the stab frame 28 of the gripper 26 so as to fixedly position the gripper 26 with respect to the end of the arm 24. The pin connections 52 and 54 can be in the nature of bolts, or other fasteners, so as to strongly connect the stab frame 28 of the gripper 26 with the arm 24. The bolts associated with pin connections 52 and 54 can be removed such that other gripper 26 can be affixed to the end of the arm 24. As such, the pipe handling system 10 is adaptable to various sizes of pipe 18 and various heights of drilling rigs 20.

The gripper 26 includes the stab frame 28 with the grippers 30 and 32 translatable along the length of the stab frame 28. This vertical translation of the grippers 30 and 32 allows the pipe 18 to be properly moved upwardly and downwardly once the vertical orientation of the pipe 18 is achieved. The grippers 30 and 32 are in the nature of conventional grippers which can open and close so as to engage the outer diameter of the pipe 18, as desired.

The link 34 is an elongate member that extends from the pivotable connection 44 with the frame 12 to the pivotable connection 68 of the second portion 50 of the lever assembly 22. The link 34 is non-extensible and extends generally adjacent to the opposite side from the boom 16 from that of the arm 24. The link 34 will generally move relative to the movement of the boom 16. The brace 36 is pivotally connected to the small framework 46 associated with boom 16 and also pivotally connected at a location along the arm 24 between the ends thereof. Brace 36 provides structural support to the arm 24 and also facilitates the desired movement of the arm 24 during the movement of the pipe 18 between the horizontal orientation and the vertical orientation.

The drilling rig 20 is illustrated as having drill pipes 60 and 62 extending upwardly so as to have an end above the drill floor 64. When the pipe 18 is in its vertical orientation, the translatable movement of the grippers 30 and 32 can be utilized so as to cause the end of the pipe 18 to engage with the box of one of the drill pipes 60 and 62.

Referring still to FIG. 1, the general movement of the bottom end of the pipe 18 is illustrated by line 66. The movement of the pivot point 68 of the connection between the lever assembly 22 and the link 34 is illustrated by line 70. Curved line 71 illustrates the movement of the pivotable connection 40 between the boom 16 and the lever assembly 22.

The coordinated movement of each of the non-extensible members of the system 10 is achieved with proper sizing and angular relationships. In essence, the system 10 provides a four-bar link between the various components. As a result, the movement of the drill pipe 18 between a horizontal orientation and a vertical orientation can be achieved purely through the mechanics associated with the various components. As can be seen, only a single hydraulic actuator may be necessary so as to achieve this desired movement. There does not need to be coordinated movement of hydraulic actuators. The hydraulic actuators are only used for the pivoting of the boom. Since the frame 12 is a skid located on the bed of a vehicle 14, the vehicle 14 can be maneuvered into place so as to properly align with the centerline of the drill pipe 60 and 62 of the drilling rig 20. Once the proper alignment is achieved by the vehicle 14, the system 10 can be operated so as to effectively move the drill pipe to its desired position. The gripper assemblies allow the drill pipe 18 to be moved upwardly and downwardly for the proper stabbing of the drill pipes 60 and 62.

Figure 2:
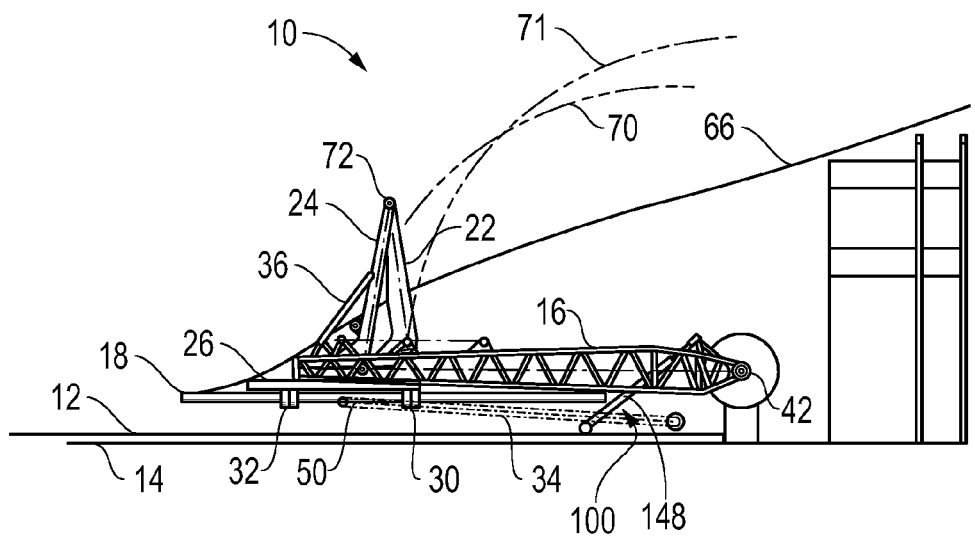
FIG. 2 shows a side elevational view of the apparatus of the present invention as used on a pipe handling system, with the system in a first position.

Referring to FIG. 2, there is shown a side elevational view of the apparatus 100 of the present invention as used on a pipe handling system 10, with the pipe handling system 10 in the first position. The drill pipe 18 is in a generally horizontal orientation. The drill pipe can be delivered to the system 10 in a position below the boom 16. In particular, the drill pipe can be loaded upon the frame 12 in a location generally adjacent to the grippers 30 and 32 associated with the gripper 26. As such, the present invention facilitates the easy delivery of the drill pipe to the desired location. The grippers 30 and 32 grip the outer diameter of the pipe 18 in this horizontal orientation. The boom 16 resides above the drill pipe 18 and in generally parallel relationship to the top surface of the frame 12. The lever assembly 22 is suitably pivoted so that the arm 24 extends through the interior of the framework of the boom 16 and such that the gripper 26 engages the pipe 18. The brace 36 resides in connection with the small frame member 46 of the boom 16 and also is pivotally connected to the arm 24. The link 34 resides below the boom 16 generally adjacent to the upper surface of the frame 12 and is connected to the second portion 50 of the lever assembly 22 below the boom 16.

Because the system 10 is in the first position, the piston of the second hydraulic piston-and-cylinder assembly 124 of the apparatus 100 is shown as in the retracted position, i.e. retracted within the cylinder 148 of the second hydraulic piston-and-cylinder assembly 124. The other hydraulic piston-and-cylinder assemblies and pneumatic springs (not shown) of the apparatus 100 are in similar retracted positions.

Figure 3:
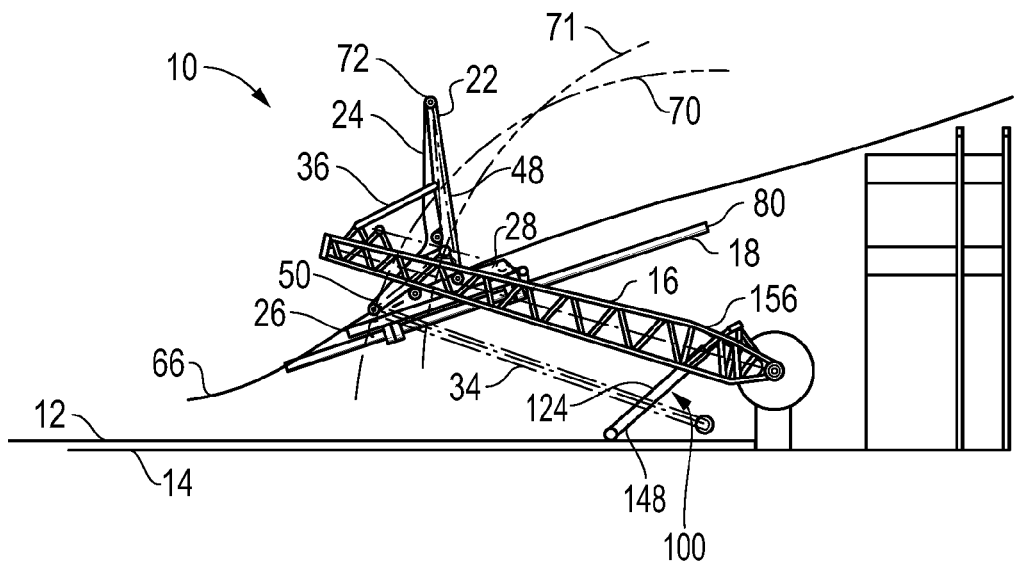
FIG. 3 shows a side elevational view of the apparatus of the present invention as used on the pipe handling system, with the pipe handling system moving from the first position toward a second position.

Referring to FIG. 3, there is shown a side elevational view of the apparatus 10 of the present invention as used on a pipe handling system 10 moving from the first position to a second position. Particularly, the system 10 is shown in an intermediate position while moving the drill pipe 18 from the horizontal orientation to the vertical orientation. As can be seen, the gripper 26 has engaged with the pipe 18. The lever assembly 22 has pivoted so that the end 79 of pipe 18 passes through the interior of the framework of the boom 16. Also, the arm 24 associated with the gripper 26 serves to move the stab frame 28 of the gripper 26 through the interior of the framework of the boom 16. The brace 36 pulls on the first portion 48 of lever assembly 22. The link 34 pulls on the end of the second portion 50 of the lever assembly 22 so as to draw the first portion 48 upwardly and to cause the movement of the stab frame 28 of the gripper 26. The apparatus 100 has operated so as to urge the boom 16 pivotally upwardly. The second piston-and-cylinder assembly 124 can be seen as extending between the frame 12 and the boom 16. The piston 156 extends slightly outwardly of the cylinder 148 of the second piston-and-cylinder assembly 124 when the system 10 is in this intermediate position. The other hydraulic piston-and-cylinder assemblies and pneumatic springs of the apparatus 100 have similar extensions to that of the second piston-and-cylinder assembly 124.

Figure 4:
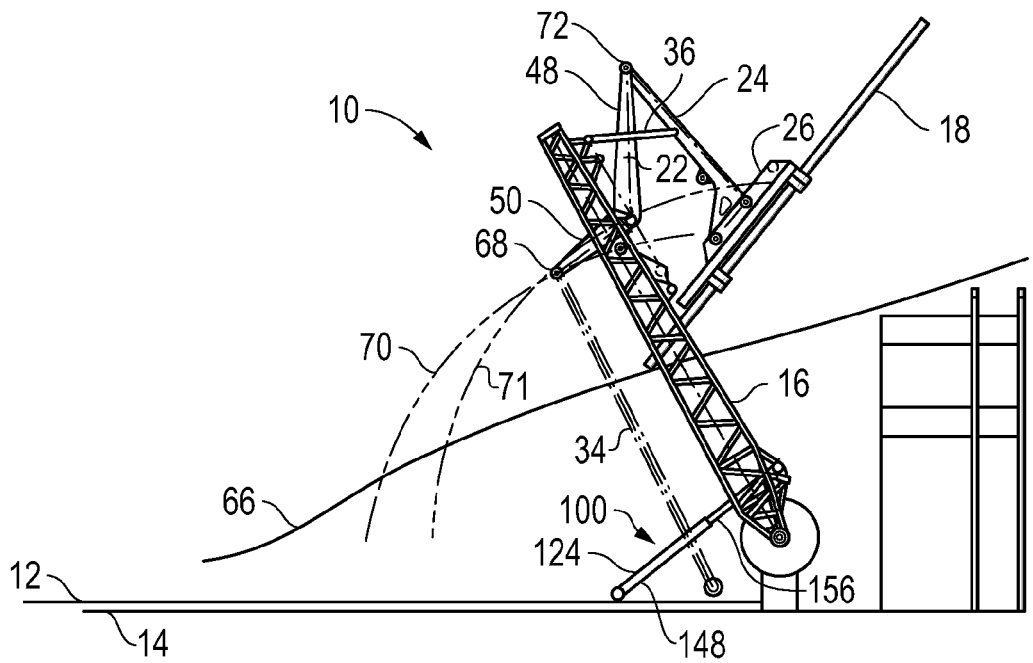
FIG. 4 shows a side elevational view of the apparatus of the present invention as used on a pipe handling system, with the pipe handling system moving further towards the second position.

Referring to FIG. 4, there is shown a side elevational view of the apparatus 10 of the present invention as used with a pipe handling system 10, with the system 10 moving further from the first position to the second position. The apparatus 100 urges the boom 16 angularly upwardly away from the top surface of the frame 12. This causes the link 34 to have a pulling force on the pivotal connection 68 of the second portion 50 of the lever assembly 22. This causes the first portion 48 of the lever assembly 22 to move upwardly thereby causing the arm 24, in combination with the brace 36, to lift the gripper 26 further upwardly and draw the pipe 18 completely through the interior of the boom 16. The second hydraulic piston-and-cylinder assembly 124 can be seen in another intermediate position as the system 10 extends further toward the second position from the first position. The piston 156 extends even further outwardly of the cylinder 148 in FIG. 4 than in the position shown in FIG. 3. The other hydraulic piston-and-cylinder assemblies and pneumatic springs of the apparatus 100 have similar extensions to that of the second hydraulic piston-and-cylinder assembly 124.

Figure 5:
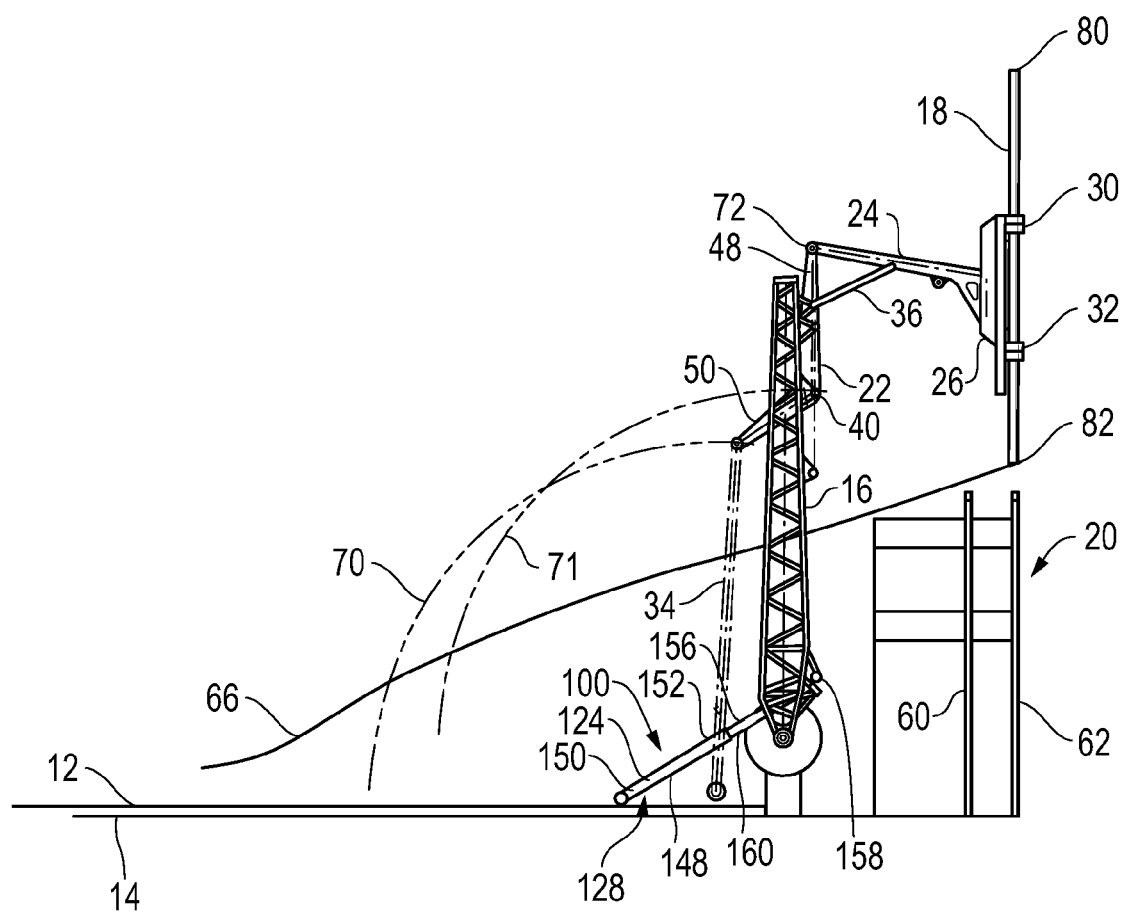
FIG. 5 shows a side elevational view of the apparatus of the present invention as used on a pipe handling system, with the pipe handling system in the second position.

Referring to FIG. 5, there is shown a side elevational view of the preferred embodiment of the present invention as used on a pipe handling system 10, with the system 10 in the second position. The drill pipe 18 is in the vertical orientation. As can be seen, the drill pipe 18 is positioned directly above the underlying pipe 62 on the drilling rig 20. The further upward pivotal movement of the boom 16 is caused by extension of the apparatus 100. This causes the link 34 to rotate and draw the end of the second portion 50 of the lever assembly 22 downwardly. The lever assembly 22 rotates about the pivot point 40 such that the first portion 48 of the lever assembly 22 has a pivot 72 at its upper end. The brace 36 is now rotated in a position so as to provide support for the arm 24 in this upper position. The gripper 26 has grippers 30 and 32 aligned vertically and in spaced parallel relationship to each other. If any further precise movement is required between the bottom end 80 of the pipe 18 and the upper end 82 of pipe 62, then the vehicle 14 can be moved slightly so as to achieve further precise movement. In the manner described hereinbefore, the drill pipe 18 has achieved a completely vertical orientation by virtue of the interrelationship of the various components of the system 10 and apparatus 100 without the need for complex control mechanisms and hydraulics. In order to install the drill pipe 18 upon the pipe 62, it is only necessary to vertically translate the grippers 30 and 32 along the stab frame 28 of the gripper 26. As such, the end 80 can be stabbed into the box connection 82 of pipe 62. Suitable tongs, spinners, or other mechanisms can be utilized so as to rotate the pipe 18 in order to achieve a desired connection. The grippers 30 and 32 can then be released from the exterior of the pipe 18 and returned back to the original position such that another length of drill pipe can be installed.

The second hydraulic piston-and-cylinder assembly 124 of the apparatus 100 has a piston 156 and a cylinder 148. An end 150 of the cylinder 148 is connected to the frame 12. An end 158 of the piston 156 is connected to the boom 16. When the apparatus 100 is activated, the apparatus 100 pivots the boom 16 relative to the frame 12 upwardly from the first position to the second position so as to cause the pipe 18 to achieve a vertical orientation. The first hydraulic piston-and-cylinder assembly of the hydraulic actuator 128 has a similar connection to the frame 12 and boom 16. The pneumatic springs are inverted relative to the hydraulic piston-and-cylinder assemblies 128 so that an end of the cylinder is connected to the boom 16 and an end of the piston is connected to the frame 12. The piston 156 of the second hydraulic piston-and-cylinder assembly 124 is shown in FIG. 5 as fully extended from the cylinder 148 so that the opposite end 160 of the piston 156 is adjacent the opposite end 152 of the cylinder 148. The other hydraulic piston-and-cylinder assemblies and gas springs of the apparatus 100 have similar extensions to that of the second hydraulic piston-and-cylinder assembly 124.

Figure 6:
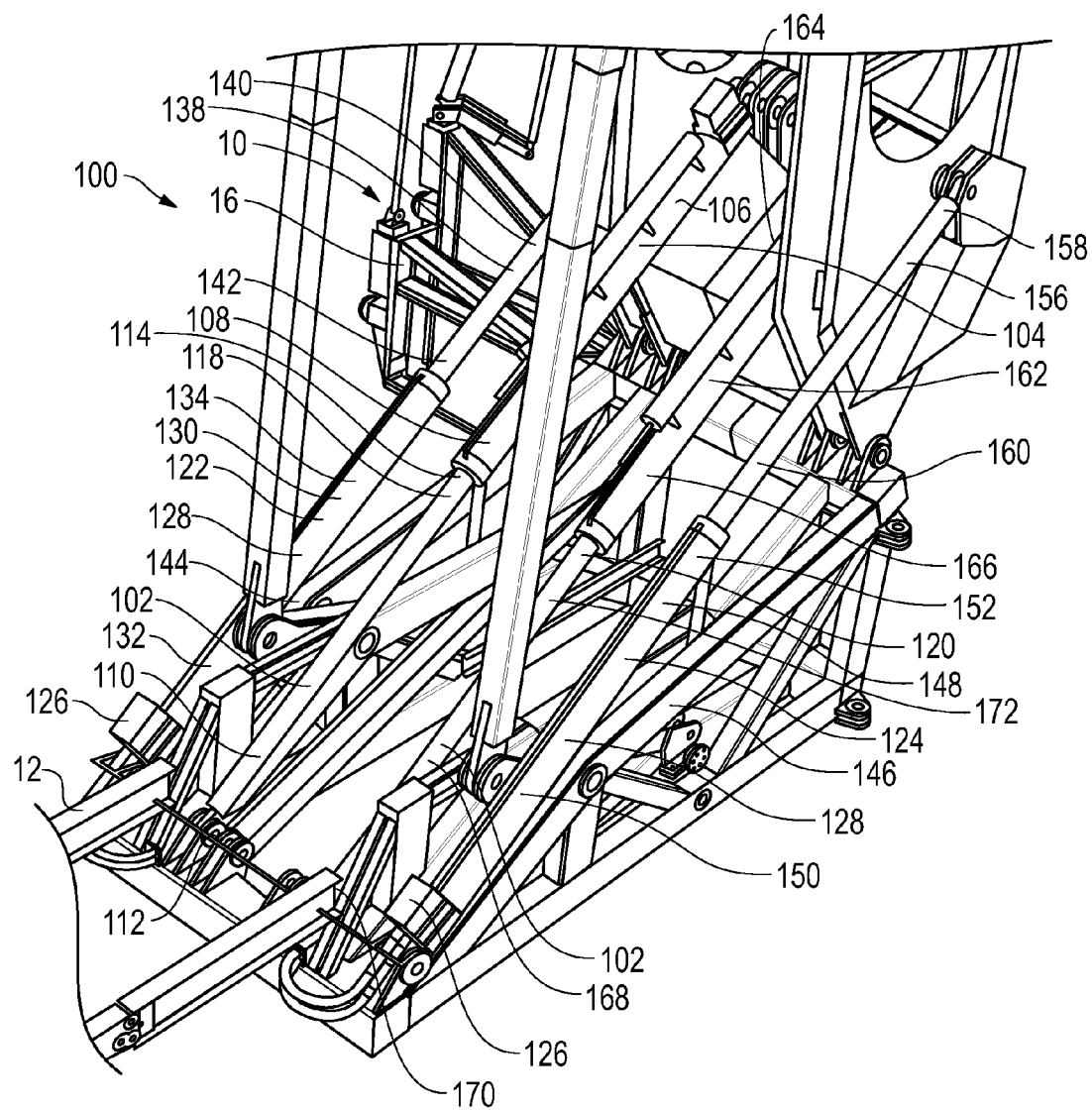
FIG. 6 shows an isolated plan perspective view of the preferred embodiment of the apparatus of the present invention.

Referring to FIG. 6, there is shown an isolated plan perspective view of the preferred embodiment of the apparatus 100 of the present invention as used on a pipe handling system 10. The system 10 is shown in the second position, with the apparatus 100 in an extended position. The apparatus 100 pivots the boom 16 of the system 10 between the first and second positions. The apparatus 100 has hydraulic piston-and-cylinder assemblies 128 connected to the boom 16 and frame 12, and pneumatic springs 102 connected to the boom 16 and frame 12.

Each of the pneumatic springs 102 has a piston and a cylinder. The first pneumatic spring 118 has a cylinder 104 that has an end 106 pivotally connected to the boom 16, and a piston 110 movably positioned within an interior of the cylinder 104. The piston 110 has an end 112 pivotally connected to the frame 12. The second pneumatic spring 120 has a cylinder 162 that has an end 164 pivotally connected to the boom 16, and a piston 168 movably positioned within an interior of the cylinder 162. The piston 168 has an end 170 pivotally connected to the skid 12. The interior of the cylinders 104 and 162 may be filled with nitrogen gas. An opposite end 114 of the piston 110 of the first pneumatic spring 118 extends within the interior of the cylinder 104 of the first pneumatic spring 118 adjacent the boom 16 when the boom 16 is in the first position. An opposite end 172 of the piston 168 of the second pneumatic spring 120 extends within the interior of the cylinder 162 of the second pneumatic spring 120 adjacent the boom 16 when the boom 16 is in the first position. An opposite end 114 of the piston 110 of the first pneumatic spring 118 extends within the interior of the cylinder 104 of the first pneumatic spring 118 adjacent an opposite end 108 of the cylinder 104 when the boom 16 is in the second position. An opposite end 172 of the piston 168 of the second pneumatic spring 120 extends within the interior of the cylinder 162 of the second pneumatic spring 120 adjacent an opposite end 166 of the cylinder 162 when the boom 16 is in the second position.

Each of the hydraulic piston-and-cylinder assemblies 128 has a piston and a cylinder. The first hydraulic piston-and-cylinder assembly 122 has a cylinder 130 having an end 132 pivotally connected to the frame 12, and a piston 138 movably positioned within an interior of the cylinder 130. The piston 138 has an end 140 pivotally connected to the boom 16. The second hydraulic piston-and-cylinder assembly 124 has a cylinder 148 having an end 150 pivotally connected to the frame 12, and a piston 156 movably positioned within an interior of the cylinder 148. The piston 156 has an end 158 pivotally connected to the boom 16.

An opposite end 142 of the piston 138 of the first hydraulic piston-and-cylinder assembly 122 extends within an interior of the cylinder 130 of the first hydraulic piston-and-cylinder assembly 122 adjacent the frame 12 when the boom 16 is in the first position. An opposite end 160 of the piston 156 of the second hydraulic piston-and-cylinder assembly 124 extends within an interior of the cylinder 148 of the second hydraulic piston-and-cylinder assembly 124 adjacent the frame 12 when the boom 16 is in the first position. The opposite end 142 of the piston 138 of the first hydraulic piston-and-cylinder assembly 122 extends within the interior of the cylinder 130 adjacent an opposite end 134 of the cylinder 130 when the boom 16 is in the second position. The opposite end 160 of the piston 156 of the second hydraulic piston-and-cylinder assembly 124 extends within the interior of the cylinder 148 adjacent an opposite end 152 of the cylinder 148 when the boom 16 is in the second position.

The hydraulic powering assembly 126 is operatively connected to the first and second hydraulic piston-and-cylinder assemblies 122 and 124. The hydraulic powering assembly 126 pumps hydraulic fluid into and out of the interiors of the cylinders 130 and 148 of the hydraulic piston-and cylinder assemblies 122 and 124 so as to cause the pistons 138 and 156 to extend and retract from the interiors of the cylinders 130 and 148. The extension and retraction of the pistons 138 and 156 pivots the boom 16 relative to the skid 12 between the first and second positions. Suitable lines are connected between the hydraulic powering assembly 126 and cylinders 130 and 148 to allow fluid to travel therebetween.

Referring still to FIG. 6, it can be seen that the first and second pneumatic springs 118 and 120 are inverted so that the cylinders 104 and 162 are connected to the boom 16 while the pistons 110 and 168 are connected to the frame 12. Having the pneumatic springs 118 and 120 in this orientation gives extra pushing force when moving the boom 16 from the first position to the second position, and gives extra braking force when moving the boom 16 from the second position to the first position. Thus, the power band requirements of the first and second hydraulic piston-and-cylinder assemblies 122 and 124 are reduced by the addition of pneumatic springs 118 and 120 in the apparatus 100. The peak and total operating pressures of the hydraulic fluid in the cylinders 130 and 148 of the hydraulic piston-and-cylinder assemblies 122 and 124 are thus reduced by the use of pneumatic springs 118 and 120. Because less hydraulic pressure is required for the hydraulic piston-and-cylinder assemblies 122 and 124, the horsepower requirements of a pump of the hydraulic powering assembly 126 are reduced. The consumption of fuel of hydraulic powering assembly 126 may be reduced by up to 75%. Because lower pressures are used on the hydraulic piston-and-cylinder assemblies 122 and 124, there is less wear and tear and thus prolonged operative life of the assemblies 122 and 124. The apparatus 100 with pneumatic springs 118 and 120 allows the energy saved to be used on other components of the pipe handling system 10, if desired. Thus, additional power supplies do not have to be purchased with use of the apparatus 100 of the present invention.

The pneumatic springs 118 and 120 are separate from the hydraulic system of the piston-and-cylinder assemblies 122 and 124. Thus, a failure in the hydraulic piston-and-cylinder assemblies 122 and 124 does not cause a failure in the pneumatic springs 118 and 120, and vice versa. The pneumatic springs 118 and 120 provide upward forces on the boom 16 as the boom 16 moves from the second position to the first position (and vice versa) so as to counter the acceleration of the boom 16 by gravity, thus "floating" the boom 16 downwardly from the second position to the first position. This "floating" makes the movement of the boom 16 safer for personnel in the vicinity of the boom and helps prevent the boom from moving too quickly and/or colliding with the frame 12 when reaching the first position.

Figure 6A:
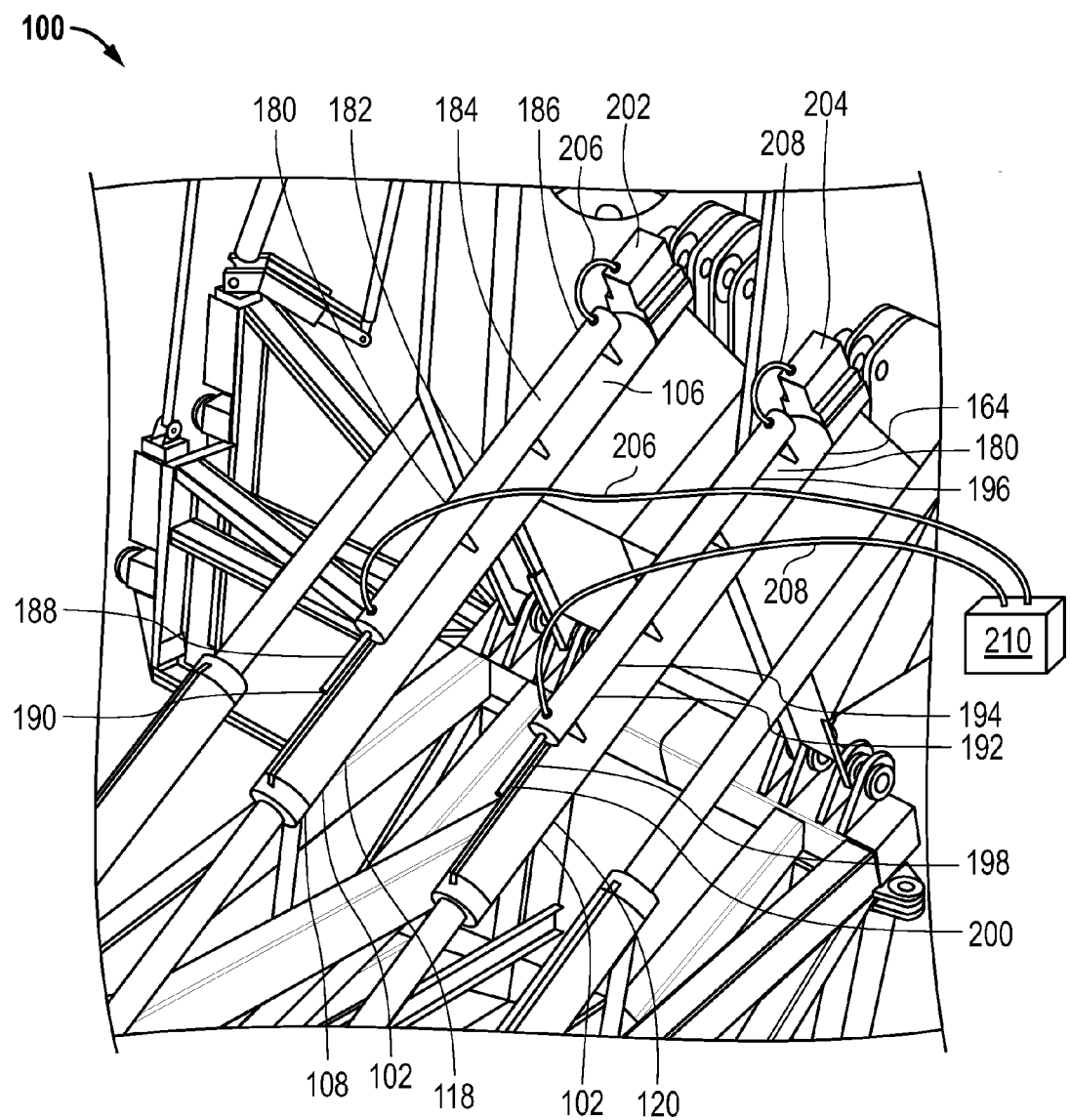
FIG. 6A shows an isolated plan perspective of the pneumatic spring assembly and pneumatic reservoirs of the preferred embodiment of the apparatus of the present invention.

Turning now to FIG. 6A, in a preferred embodiment of the apparatus 100, a pair of pneumatic reservoirs 180 may be located adjacent to the pneumatic springs 102 in order to provide even greater control over the pushing and braking forces provided for by the pneumatic springs 102. The pneumatic reservoirs may be directly attached to the pneumatic springs 102, and may be oriented parallel to the pneumatic springs 102. The pneumatic reservoirs 180 may each include a cylinder and piston. In a preferred embodiment of the apparatus 100, the pneumatic reservoirs 180 may be replaced with other accumulator devices, such as variable displacement accumulators, that may variably change the pneumatic pressure within the pneumatic springs 102.

A first pneumatic reservoir 182 is adjacent the first pneumatic spring 118. A second pneumatic reservoir 192 is adjacent the second pneumatic spring 120. The first pneumatic reservoir 182 has a cylinder 184 that has an end 186 adjacent to the end 106 of the first pneumatic spring 118. The first pneumatic reservoir 182 additionally has a piston 188 that has a rod end 190 of the piston 188 adjacent to the opposite end 108 of first pneumatic spring 118. The piston 188 of the first reservoir cylinder 182 is slidably positioned within an interior of the cylinder 184. The piston 188 additionally defines a liquid-containing space within the cylinder 184. This liquid-containing space has a hydraulic liquid present therein.

A second reservoir cylinder 192 is adjacent the second pneumatic spring 120. The second reservoir cylinder 192 has a cylinder 194 that has an end 196 adjacent to the end 164 of the second pneumatic spring 118. Second reservoir cylinder 192 has a piston 198 that has a rod end 200 of the piston 198 adjacent to the opposite end 108 of second pneumatic spring 120. The piston 198 of the second reservoir cylinder 192 is slidably positioned within an interior of the cylinder 194. The piston 198 additionally defines a liquid-containing space within the cylinder 194. This liquid-containing space has a hydraulic liquid present therein.

The first pneumatic reservoir 182 is fluidically connected to the first cylinder 104 via a first pneumatic valve 202. In the preferred embodiment of the apparatus 100, the first pneumatic valve 202 is fluidically connected to the first pneumatic reservoir 182 and cylinder 104 at ends 186 and 106, respectively. The second pneumatic reservoir 192 is fluidically connected to the second cylinder 162 via a second pneumatic valve 204. In the preferred embodiment of the apparatus 100, the second pneumatic valve 204 is fluidically connected to the second pneumatic reservoir 192 and cylinder 162 at ends 196 and 164, respectively.

A first hydraulic line 206 is fluidically connected to an opposite end of the first pneumatic reservoir cylinder 182. The first hydraulic line 206 fluidically connects the liquid receiving space of the first pneumatic reservoir cylinder 182 with a hydraulic fluid source 210. A second hydraulic line 208 is fluidically connected to an opposite end of the second pneumatic reservoir cylinder 192. The second hydraulic line 208 fluidically connects the liquid receiving space of the second pneumatic reservoir cylinder 192 with the hydraulic fluid source 210.

The hydraulic fluid source 210 may supply a quantity of hydraulic fluid to the liquid receiving space within the pneumatic reservoirs 180 via the first and second hydraulic lines 206 and 208. In a preferred embodiment of the apparatus 100, the hydraulic fluid is a hydraulic oil. The hydraulic fluid thus may increase or decrease the pressure within the first and second liquid receiving space located within pneumatic reservoir cylinders 184 and 194. As the hydraulic fluid fills the liquid receiving space located within pneumatic reservoir cylinders 184 and 194, it causes pneumatic reservoir pistons 188 and 198 to retract in the direction of the reservoir cylinder ends 186 and 196. This causes the pneumatic pressure within the reservoir cylinders 184 and 194 to increase, which, in a preferred embodiment, is a nitrogen gas. The increase in nitrogen gas pressure causes the nitrogen gas to travel from the first and second pneumatic reservoirs 182 and 192 into the respective first and second pneumatic springs 118 and 120 via the respective first and second pneumatic valves 202 and 204. The resulting increase in nitrogen gas pressure within the pneumatic springs 102 serves to increase the stiffness and resiliency provided for by the pneumatic springs 102. Likewise, to decrease the stiffness and resiliency in pneumatic springs 102, the hydraulic fluid source 210 may simply reverse the flow of the hydraulic fluid back from the pneumatic reservoirs 180 to the hydraulic fluid source 210 through the first and second hydraulic lines 206 and 208. This in turn decreases the fluid pressure inside the pneumatic reservoirs, and as fluid flows from the pneumatic springs 102 back into the pneumatic reservoirs 180, will decrease the pressure and stiffness of the pneumatic springs 102.

During operation of the apparatus 100, it is desirable for the pneumatic springs 102 to provide sufficient stiffness and resistance to the load being encountered in order to reduce the amount of force required for the hydraulic assemblies to raise or lower the boom. However, due to the different loads that may be encountered by the apparatus 100, as well as different forces at a particular stroke during the travel of the boom 10 between the first and second positions, a real-time variable pneumatic spring resistance is desired to most efficiently and effectively provide pushing and braking forces to the hydraulic assemblies 128. More specifically, various factors may affect the optimal amount of pneumatic pressure within the pneumatic spring assembly, including the type of pipe or tubular currently being moved, the weight of the load currently being moved, the speed at which the operation is being conducted, the amount of energy conservation desired for a given operation, as well as other possible factors. These factors may accordingly affect the optimal level of pneumatic pressure that should be present within the pneumatic spring assemblies.

Thus, in the preferred embodiment of the apparatus 100, positional sensors may be located on apparatus 100 to provide feedback information on the real-time position of various elements of the apparatus 100. More specifically, positional sensors may be located on the boom 16, the hydraulic assemblies 128, the pneumatic springs 102, the pneumatic reservoirs 180, or any combination of the aforementioned elements. These positional sensors may collectively provide positional feedback information for the apparatus 100, and the positional feedback information may then be used either alone or in combination with other feedback information to adjust hydraulic pressure in the hydraulic assemblies 128 or pneumatic pressure in the pneumatic springs 102.

In another embodiment, pressure sensors may be present in apparatus 100 to provide information on the current hydraulic pressure of the hydraulic assemblies 128. Preferably, the pressure sensors may be located on the hydraulic assemblies 128 to provide feedback information of the current pressure of the hydraulic fluid. Pressure sensors may also be located on the pneumatic springs 102 or on the pneumatic reservoirs 180 to provide feedback information on the current pneumatic pressure within those respective devices. As with the positional feedback information, the pressure feedback information obtained by the pressure sensors may be used either alone or in combination with other feedback information to adjust hydraulic pressure in the hydraulic assemblies 128 or pneumatic pressure in the pneumatic springs 102.

In still another embodiment, flow meters may be located on the apparatus 100 to measure the flow rate of hydraulic or pneumatic fluid. In this manner, the apparatus 100 may determine, based upon the measured hydraulic or pneumatic flow rate, what the optimal hydraulic pressure for the hydraulic assemblies 128 should be at a given location or stroke of boom 128. The apparatus 100 may accordingly adjust the hydraulic fluid pressure in the hydraulic assemblies 128 or the pneumatic fluid pressure in the pneumatic springs 102. Additionally, hydraulic or pneumatic flow rate may alternatively be calculated based upon feedback data provided by the positional sensors, without the use of flow meters.

In a preferred embodiment, the apparatus 100 may adjust the stiffness of the pneumatic springs 102 to support the hydraulic assemblies in a fully automatic mode. In this mode, a controller, or computer receives feedback information received from any combination of the positional sensors, pressure sensors, and flow meters to perform geometric calculations to determine the optimal pneumatic pressure for the pneumatic springs 102. In this fully automatic mode, the computer automatically and continuously adjusts the pressure inside the pneumatic springs 102 in real-time to optimize the amount of energy necessary for the raising and lowering of boom 16 as the boom 16 moves between the first and second positions, In another embodiment, the apparatus 100 may adjust the stiffness of the pneumatic springs 102 to support the hydraulic assemblies in a fully manual mode. In this mode, a rig operator may manually control the flow of hydraulic oil between the hydraulic fluid source 210 and the pneumatic reservoirs 180 in order to control the pneumatic pressure present inside pneumatic springs 102.

In still another embodiment, the apparatus 100 may adjust the stiffness of the pneumatic springs 102 to support the hydraulic assemblies in a semi-automatic mode. In this mode, the computer receives feedback information received from any combination of the positional sensors, pressure sensors, and flow meters and performs geometric calculations to determine a number of pneumatic pressure settings for the pneumatic springs 102. The settings may be based upon different needs of the rig operator, and may allow for the pneumatic springs 102 to provide minimal or significant assistance to the hydraulic assemblies 128. The rig operator may then select a setting to be applied to the pneumatic reservoirs 180, which, in turn, affects the pneumatic pressure present in the pneumatic springs 102.

Figure 7:
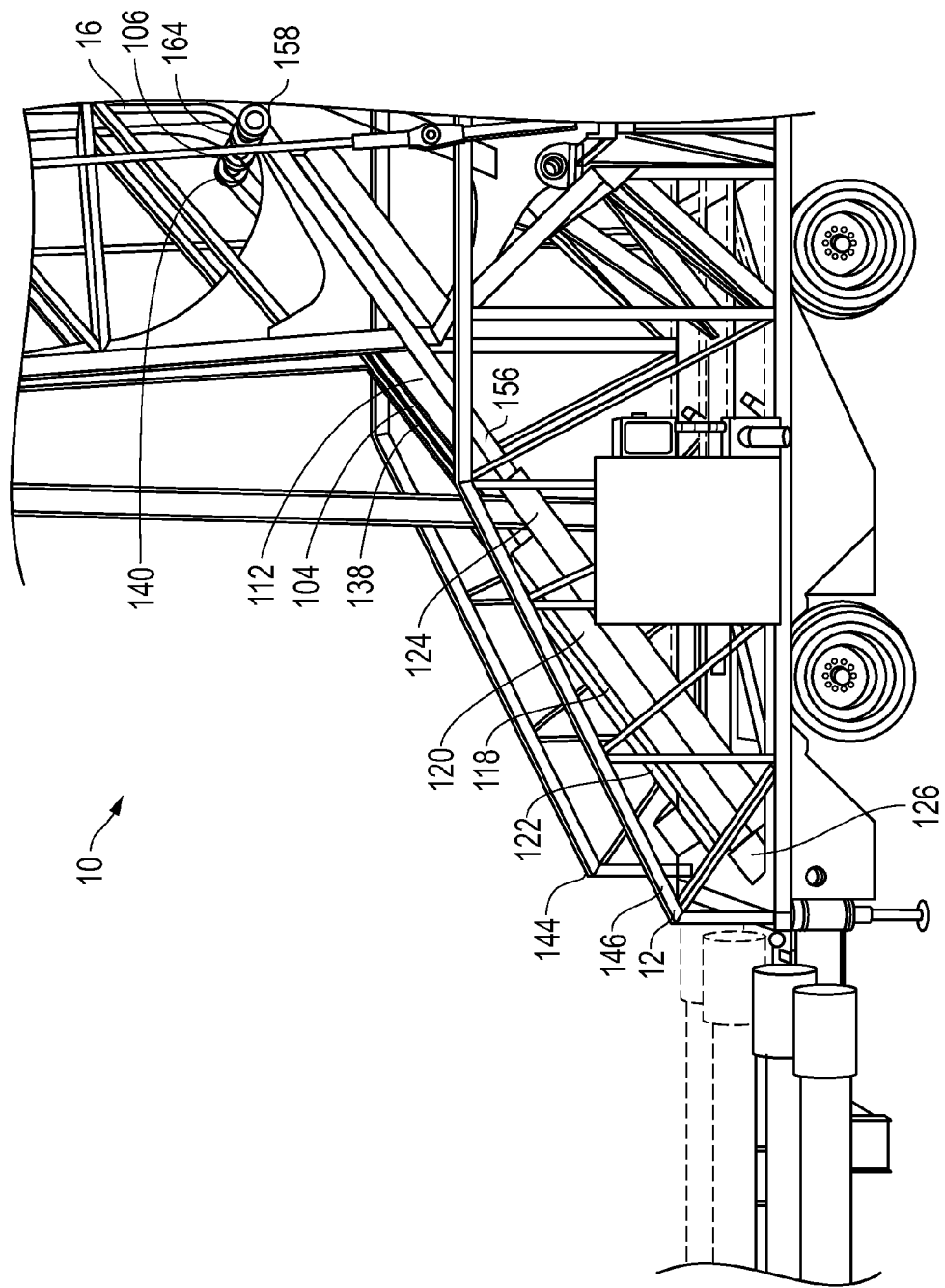
FIG. 7 shows a side perspective view of the preferred embodiment of the apparatus of the present invention.

Referring to FIG. 7, there is shown a side perspective view of the apparatus 100 of the present invention as used on a pipe handling system 10. The end 158 of the piston 156 of the second hydraulic piston-and-cylinder assembly 124 can be seen pivotally connected to the boom 16. The end 164 of the cylinder 162 of the second pneumatic spring 120 can be seen pivotally connected to the boom 16. The end 106 of the cylinder 104 of the first pneumatic spring 118 can be seen pivotally connected to the boom 16. The end 140 of the piston 138 of the first piston-and-cylinder assembly 122 can be seen pivotally connected to the boom 16. The first hydraulic piston-and-cylinder assembly 122 is positioned adjacent the side 144 of the frame 12. The second hydraulic piston-and-cylinder assembly 124 is positioned adjacent the opposite side 146 of the frame 12. The first pneumatic spring 118 is positioned between the first and second hydraulic piston-and-cylinder assemblies 122 and 124 adjacent the side 144 of the frame 12. The second pneumatic spring 120 is positioned adjacent the opposite side 146 of the frame 12 between the first and second hydraulic piston-and-cylinder assemblies 122 and 124. The frame 12 is shown with sides 144 and 146, which is a structural framework suitable for housing the rest of the pipe handling system 10.

The foregoing disclosure and description of the invention is illustrative and explanatory thereof. Various changes in the details of the illustrated construction can be made within the scope of the appended claims without departing from the true spirit of the invention. The present invention should be limited only by the following claims and their legal equivalents.

What is claimed is:

1. A pipe handling apparatus comprising:
   a frame;
   a boom pivotally connected to the frame, the boom being movable between a first position and a second position;
   a gripping assembly connected to the boom for gripping a surface of a tubular;
   a hydraulic actuating assembly having one end pivotally connected to the frame and an opposite end pivotally connected to the boom, the hydraulic actuating assembly for moving the boom between the first and second positions;
   a pneumatic spring assembly having one end pivotally connected to the frame and an opposite end pivotally connected to the boom, the pneumatic spring assembly for urging the boom from the first position to the second position and for resisting movement of the boom from the second position to the first position;
   a pneumatic reservoir assembly for varying a pneumatic pressure within the pneumatic spring assembly, comprising:
      a cylinder;
      a hydraulically driven piston slidably received in the cylinder defining a gas-containing space within the cylinder, the gas-containing space being filled with a compressible fluid; and,
      the gas-containing space pneumatically connected to the pneumatic spring assembly; and,
   a controller for automatically controlling the pneumatic pressure within the pneumatic spring assembly based upon feedback provided by a sensor assembly.

2. The pipe handling apparatus of claim 1, the piston defining a liquid-containing space within the cylinder, the liquid-containing space having a hydraulic fluid therein.

3. The pipe handling apparatus of claim 2, the hydraulic fluid being a hydraulic oil.

4. The pipe handling apparatus of claim 2, further comprising a hydraulic pumping assembly fluidically connected to the liquid-containing space within the cylinder, the hydraulic pumping assembly for pumping hydraulic fluid between the hydraulic pumping assembly and the cylinder so as to slidably move the piston inside the cylinder.

5. The pipe handling apparatus of claim 1, further comprising:
   a gas-charging assembly fluidically connected to the gas-containing space, the gas-charging assembly for passing the compressible fluid between the gas-containing space and the pneumatic spring assembly to vary the pneumatic pressure within the pneumatic spring assembly.

6. The pipe handling apparatus of claim 1, the compressible fluid being a nitrogen gas.

7. The pipe handling apparatus of claim 1, the pneumatic spring assembly further comprising:
   a first pneumatic spring having a first end pivotally connected to the frame and a second end pivotally connected to the boom; and,
   a second pneumatic spring adjacent the first pneumatic spring and having a first end pivotally connected to the frame and a second end pivotally connected to the boom.

8. The pipe handling apparatus of claim 7, the pneumatic reservoir assembly comprising:
   a first piston-and-cylinder assembly connected to the first pneumatic spring; and,
   a second piston-and-cylinder assembly connected to the second pneumatic spring.

9. The pipe handling apparatus of claim 1, further comprising:
   the sensor assembly for providing feedback on the condition of the pipe handling apparatus.

10. The pipe handling apparatus of claim 1, the sensor assembly comprising positional sensors for measuring the position of the boom relative to the frame.

11. The pipe handling apparatus of claim 1, the sensor assembly comprising pressure sensors for measuring the pressure in the hydraulic actuating assembly.

12. The pipe handling apparatus of claim 1, the sensor assembly comprising flow meters for measuring the flow of pneumatic fluid within the pneumatic spring assembly.

* * * * *